United States Patent [19]

Gillingham et al.

[11] Patent Number: 5,743,490
[45] Date of Patent: Apr. 28, 1998

[54] FLAP/SLAT ACTUATION SYSTEM FOR AN AIRCRAFT

[75] Inventors: Gary D. Gillingham, Cherry Valley; Gary L. Miles, Stillman Valley, both of Ill.

[73] Assignee: Sundstrand Corporation, Rockford, Ill.

[21] Appl. No.: 602,190

[22] Filed: Feb. 16, 1996

[51] Int. Cl.⁶ .................................................. B64C 13/26
[52] U.S. Cl. ............................................. 244/75 R; 244/213
[58] Field of Search .................................. 244/75 R, 213, 244/214, 203; 60/401–406; 91/363, 509, 512, 522; 74/89.15, 424.8 R

[56] References Cited

U.S. PATENT DOCUMENTS

| | | | |
|---|---|---|---|
| 3,662,550 | 5/1972 | Lichtfuss | 60/53 R |
| 3,935,754 | 2/1976 | Comollo | 244/213 |
| 4,256,277 | 3/1981 | Embree | 244/213 |
| 4,260,121 | 4/1981 | Baston et al. | 244/213 |
| 4,441,675 | 4/1984 | Boehringer et al. | 244/213 |
| 4,459,867 | 7/1984 | Jones | 74/89.15 |
| 4,633,984 | 1/1987 | Hudson | 244/75 R |
| 4,779,822 | 10/1988 | Burandt et al. | 244/75 R |
| 4,892,274 | 1/1990 | Pohl et al. | 244/75 R |
| 5,092,539 | 3/1992 | Caero | 244/75 R |
| 5,484,043 | 1/1996 | Quick et al. | 188/187 |

OTHER PUBLICATIONS

Cover sheet and p. 21 of a brochure printed by G.W. Lisk Company, Inc. showing heavy duty solenoids.

*Primary Examiner*—Galen L. Barefoot
*Attorney, Agent, or Firm*—Lawrence E. Crowe

[57] ABSTRACT

The problem of providing a flight control panel actuation system, including asymmetry brakes, which will fit into aircraft wings having narrow supercritical air foil shapes, and yet provide a degree of safety with regard to preventing asymmetry which is as good or better than that provided by prior actuation systems is solved by an actuation system which positions an asymmetry brake inboard of an outermost flight control panel actuator within the aircraft wing. The asymmetry brake utilizes a jaw type clutch coupled to an electrical solenoid through a ball spline mechanism to provide significantly greater braking capacity in a given volume than other types of braking devices. The outermost control panel actuator includes an integral no-back to hold that actuator against further movement, should a driveline connection between the asymmetry brake and the actuator be severed. Where the actuation system includes multiple actuators, only one of the actuators is equipped with end of travel stops, therefore allowing the remaining actuators in the system to be physically smaller because they are not required to react loads incident with limiting end of travel. By making the other actuators in the system physically smaller, they are more readily fitted into supercritical wings.

7 Claims, 6 Drawing Sheets

FLAP/SLAT ACTUATION SYSTEM FOR AN AIRCRAFT

TECHNICAL FIELD

This invention is related to aircraft flight control systems, and more particularly to a flap/slat actuation system for use in aircraft having extremely narrow, supercritical airfoil wing designs.

BACKGROUND

Aircraft wings often include a series of movable flight control panels, known as flaps or slats, as shown in FIG. 1, that can be selectively extended or retracted to modify the lift producing characteristics of the wings. Extension and retraction of such flaps or slats is accomplished by a flight control actuation system mounted in the wing.

A typical actuation system includes a series of actuators spaced along the span of each wing, and operably connected to move one or more individual flight control panels. Adjacent actuators are connected to each other by drive shafts, to in essence form a chain of actuators and shafts extending along the span of the wing. A power drive unit (PDU) connected to the inboard end of the chain provides motive power for driving the actuators to selectively extend or retract the flight control surfaces.

Because control surfaces such as flaps or slats significantly alter the lift producing characteristics of the wings, it is critical for safe operation of the aircraft that the actuation system also include safety features for detecting and reacting to problems such as jamming, or failure of one of the actuators or drive shafts in the aircraft flight control system. Of particular concern are problems which cause the position of the flaps or slats on one wing to lose synchronization with the flaps and slats on the other wing of the aircraft. Such a condition is referred to as asymmetry. To prevent asymmetry, actuation systems for flaps and slats often include a device known as an asymmetry brake which engages to hold the chain of actuators and shafts in a known position, should a problem occur in the actuation system that cannot be corrected through use of the PDU alone. For example, should one of the shafts connecting adjacent actuators break, the PDU would not be able to control the position of flaps or slats outboard of the broken shaft. Without some means, such as an asymmetry brake at the outboard end of the chain of actuators and shafts, for holding the flaps or slats downstream from the broken shaft against further movement, aerodynamic loads acting upon the flaps or slats could move them to an uncommanded position which would create serious flight control problems for the aircraft.

It has been standard practice for many years, therefore, to include asymmetry brakes at the outboard end of the chain of actuators and shafts, as shown in FIG. 1. Furthermore, there is a longstanding belief by those having skill in the art that where asymmetry brakes were used, they had to be positioned outboard of the last actuator in the chain in order to be effective.

U.S. Pat. No. 3,862,550 to Lichtfuss, U.S. Pat. No. 4,779,822 to Burandt et al., and U.S. Pat. No. 5,484,043 to Quick et al., describe flight control actuation systems and asymmetry brake devices such as those described above. As will be readily apparent from these patents, actuation systems for critical aircraft flight control surfaces, such as flaps and slats, are designed to have a high degree of redundancy for monitoring and reacting to problems which could lead to asymmetry.

For aircraft currently being designed, however, there is a strong desire to use supercritical airfoil shapes for the wings to minimize fuel consumption. The resulting wings are very narrow, making it difficult to mount an actuation system of typical construction inside of the wing. The supercritical wings of one such aircraft are so narrow at their tips, in fact, that there is not enough space within the wing tip for mounting an asymmetry brake outboard of the outermost actuator, as has historically been done in prior flight control panel actuation systems.

Accordingly, it is an object of our invention to provide a flight control panel actuation system, including asymmetry brakes, which will fit into wings having narrow supercritical airfoil shapes, and yet provide a degree of safety with regard to preventing asymmetry which is as good or better than that provided by prior actuation systems. Further objects of our invention include providing:

a) an actuation system including highly reliable components of straightforward design that can be produced at reasonable cost and minimum weight;

b) an actuation system that facilitates operation of the aircraft; and c) an actuation system that minimizes manual system readiness checks and maintenance.

SUMMARY

Our invention provides such an actuation system by positioning the asymmetry brakes inboard of the outermost actuator in each wing, rather than outboard of the outermost actuator as has historically been done in prior aircraft flight control panel actuation systems.

Even with the asymmetry brakes repositioned inboard of the outermost actuators, however, there was still insufficient space within the supercritical wings of the aircraft described above to house an asymmetry brake of any known prior construction at the new location. It was, therefore, necessary to develop a new, more compact, and very powerful asymmetry brake for use in our new flight control panel actuation system. The new asymmetry brake developed for use in our system is described in greater detail in a co-pending patent application, application Ser. No. 08/602,433, filed Feb. 16, 1996.

The new brake utilizes a jaw type clutch coupled to an electrical solenoid through a ball spline mechanism to provide significantly greater braking capacity in a given volume than other types of braking devices. The ball spline is configured to significantly reduce the internal friction load which the electrical solenoid must overcome to apply or release the brake, resulting in a smaller physical size and current draw of the solenoid. The jaw clutch and ball spline are also configured to reduce or absorb shock loads on various internal components of the braking apparatus when the brake is engaged. By configuring the ball spline and jaw clutch to function as shock absorbers in addition to performing their primary functions, the need for separate elastomeric shock absorbers, etc., is eliminated. The electrical solenoid utilizes a pair of strategically shaped and located conical surfaces on the plunger and electromagnetic core of the solenoid to provide an optimal balance between actuation force, stroke, and current draw, by placing the conical surfaces in such a manner that both the primary magnetic flux and the leakage flux generated by the electromagnetic coils combine and contribute to generating the actuation force exerted by the electrical solenoid. A bifilar winding within the electrical solenoid provides a substantially identical amount of actuation force for a given stroke and current draw, when the bifilar winding is provided with electrical current from either of two independent sources of electrical current. Drain passages and a coating that is resistant to retention of a condensate thereupon applied to the conical surfaces of the solenoid provide a mechanism for insuring that fluid condensing on the conical surfaces does not inhibit operation of the electrical solenoid.

In some embodiments of our invention, the outermost actuator includes an integral no-back to hold that actuator against further movement, should the driveline connection between the asymmetry brake and the actuator be severed.

According to another aspect of our invention, all actuators in a given driveline of the actuation system may be equipped with integral force limiters to lock the driveline against further rotation, should the driveline or one of the control panels become jammed.

According to yet another aspect of our invention, only the outermost, or alternatively only the innermost actuator in one of the drivelines can be equipped with end of travel stops. With this arrangement, the actuator equipped with the stops functions as a master actuator, and limits the travel of all other "slave" actuators in the same driveline by virtue of the operable connection between the master and slave actuators provided by the driveline. With this arrangement, the slave actuators may be made physically smaller because they are not required to react loads incident with limiting end of travel. The slave actuators of our system therefore are more readily fitted into supercritical wings than intermediate actuators of prior systems which historically required that end of travel stops large enough to stop the entire driveline be built into every actuator in the driveline.

These and other aspects and advantages of our invention will be apparent to those having skill in the art upon consideration of the following drawing figures and detailed description of the exemplary embodiments of our invention.

DESCRIPTION OF THE INVENTION

Figure 1:
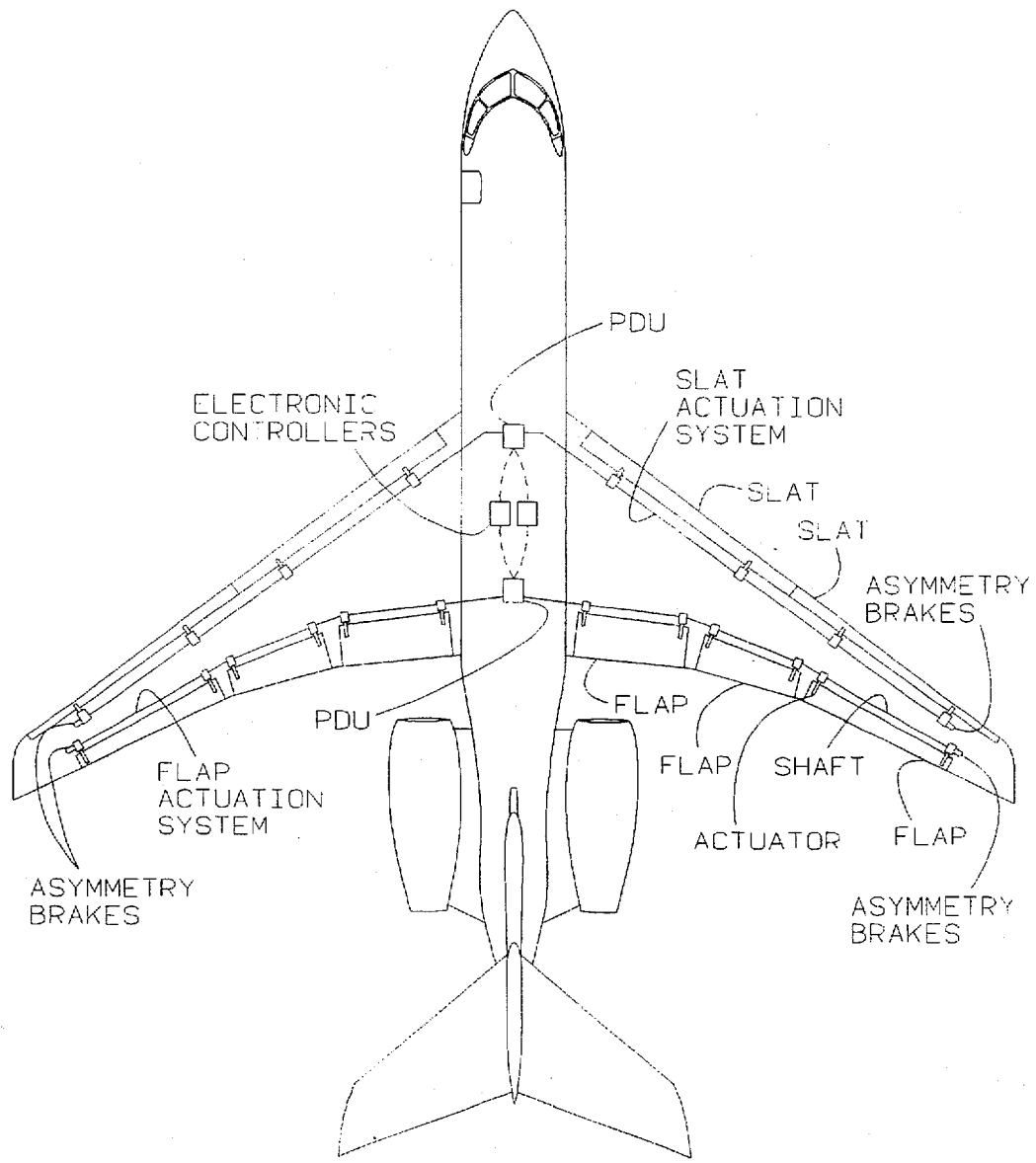
FIG. 1 is a plan view of an aircraft utilizing a prior slat and flap actuation system in which the asymmetry brakes are located outboard of the outermost actuator in the driveline of the actuation system.
Figure 2:
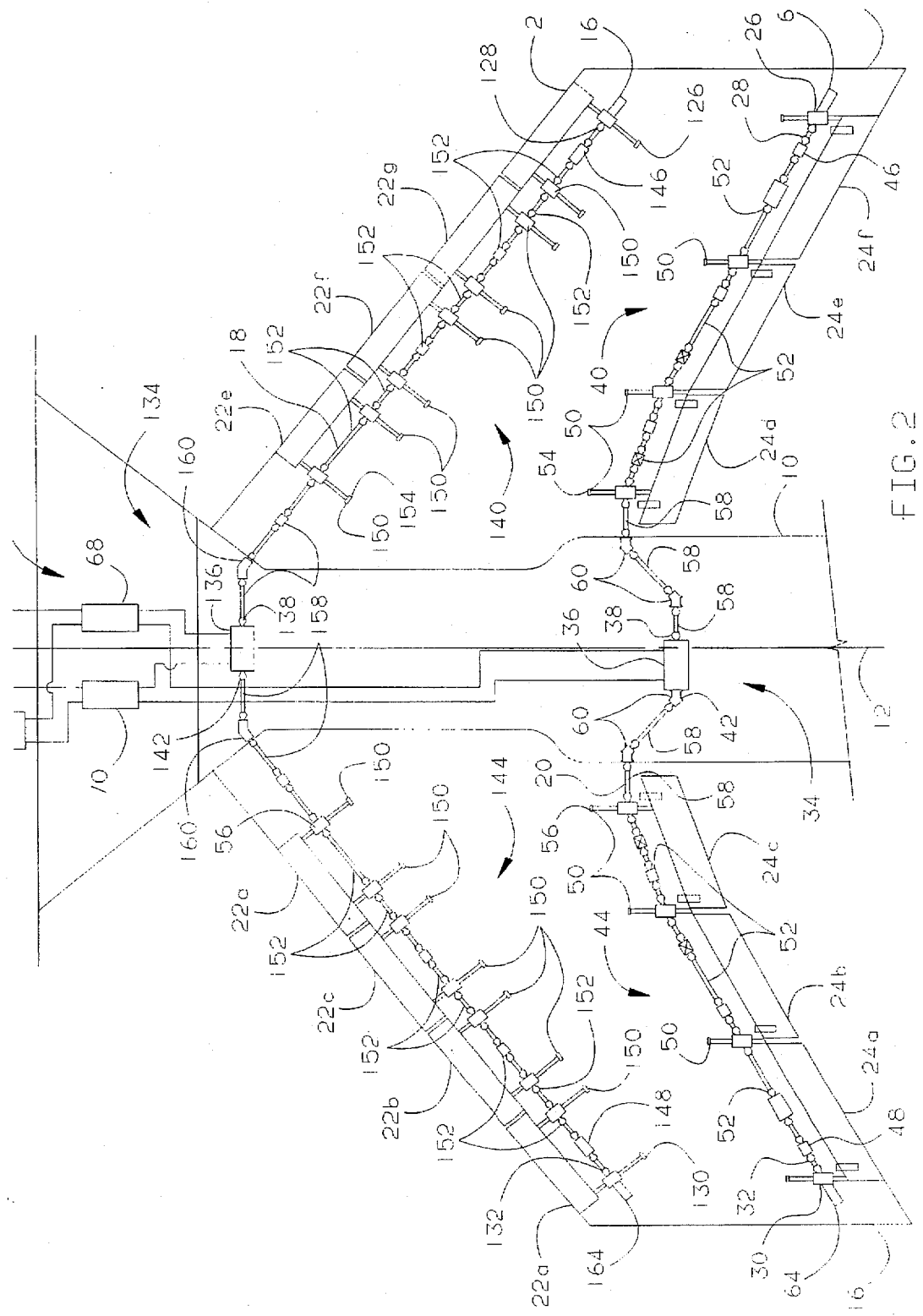
FIG. 2 is a graphical representation of a flap and slat control system according to our invention.

FIG. 2 depicts; an exemplary embodiment of our invention in the form of an aircraft 10 having right and left wings 14, 16 extending in opposite directions from a center line 12 of the aircraft 10. Each of the wings 14, 16 include multiple flight control panels in the form of slats 22a–h, and flaps 24a–f. Specifically, there are four slats disposed along the leading edge of each wing, the slats being designated in order of their proximity to the center line 12 as the inboard slats 22d,e, the first middle slats 22c,f, the second middle slats 22b,g, and the outboard slats 22a,h, of the left and right wings 16, 14 respectively. There are three flaps disposed at the trailing edge of each wing designated in order of their proximity to the center line as the inboard flaps 24c, d, the middle flaps 24b, e, and the outboard flaps 24a, f of the left and right wings 16, 14 respectively. Each of the slats and flaps is operably attached in a conventional manner to its respective wing in a manner allowing it to move by extending or retracting relative to its respective wing.

THE FLAP CONTROL ACTUATION SYSTEM

The flap control actuation system 20 includes a right outermost flap actuator 26 having a rotatable input 28 for receiving a driving torque. The right outermost flap actuator 26 is operably connected between the right wing 14 and the right outboard flap 24f of the right wing 14 for moving the right outboard flap 24f relative to the right wing 14 when driving torque is applied to the rotatable input 28 of the right outermost flap actuator 26.

The flap actuation system 20 also includes a left outermost flap actuator 30 having a rotatable input 32 for receiving a driving torque. The left outermost flap actuator 30 is operably connected between the left wing 16 and the left outboard flap 24a of the left wing 16 for moving the left outboard flap 24a relative to the left wing 16 when a driving torque is applied to the rotatable input 32 of the left outermost flap actuator 30.

Flap power drive means, generally indicated at 34, are operably connected between the rotatable inputs 28, 32 of the right and left outermost flap actuators 26, 30 for providing driving torque; simultaneously to the inputs 28, 32 of the actuators 26, 30 for symmetrically positioning the right and left flaps 24a–f, relative to the right and left wings 14, 16 respectively. Specifically, the flap power drive means 34 includes a flap power drive unit (PDU) 36 having a first output 38 operably connected by a right driveline portion 40 of the power drive means 34 to the right outermost flap actuator 26, and further having a second output 42 operably connected by a left driveline portion 44 of the power drive means 34 to the left outermost flap actuator 30.

The right driveline portion 40 of the flap power drive means 34 includes a selectively engagable right flap asymmetry brake 46 disposed between the flap PDU 36 and the right outermost flap actuator 26 for stopping rotation of the right driveline 40 when the right flap asymmetry brake 46 is engaged. Specifically, the right flap asymmetry brake 46 is located immediately inboard of the right outermost flap actuator 26 and operably connected to the rotatable input 28 of the right outermost flap actuator 26.

The left driveline portion 44 of the flap power drive means 34 includes a selectively engagable left flap asymmetry brake 48 disposed in the left driveline 44 between the flap PDU 36 and the left outermost flap actuator 30, for stopping rotation of the left driveline 44 when the left flap asymmetry brake 48 is engaged. Specifically, the left flap asymmetry brake 48 is located immediately inboard of the left outermost flap actuator 30, and operably attached to the rotatable input 32 of the left outermost flap actuator 30.

Between the flap PDU 36 and the right and left asymmetry brakes 46, 48, the right and left driveline portions 40, 44 include three intermediate flap actuators 50 connected to one another and to the right and left asymmetry brakes 46, 48 by a series of torque shaft/support bearing units 52. The right and left inboard and middle flaps 24d, e; 24c, b are each operably connected to the right and left wings 14, 16 respectively, by two of the intermediate flap actuators 50. The right and left outboard flaps 24f, 24a are each respectively operably connected to the right and left wings 14, 16 by one of the intermediate flap actuators 50 and the right or left outermost flap actuators 26, 30. Between the flap PDU 36 and the innermost right and left intermediate flap actuators 54, 56 the right and left drivelines 40, 44, respectively, each include a series of torque tubes 58 and angle gearboxes 60 for transmitting driving torque from the flap PDU 36 to the remainder of the right and left drivelines 40, 44.

Redundant flap control means 66 are operably connected between the flaps and the right and left flap asymmetry brakes 46, 48 for sensing an asymmetry between the positions of the right flaps 24d, e, f, relative to the left flaps 24c, b, a, and for engaging the flap asymmetry brakes 46, 48 when the asymmetry between the positions of the right and left flaps 24d, e, f; 24c, b, a exceeds a pre-determined maximum allowable value.

The flap control means 66 includes right and left angular position sensors in the form of resolvers 62, 64 operably connected respectively to the right and left outermost flap actuators 26, 30 for sensing an angular position of the rotatable inputs 28, 32 of the outermost flap actuators 26, 30.

The flap control means 66 also includes a first and a second slat/flap control unit (SFCU)68, 70 electrically connected to receive a flap asymmetry signal from the right and left resolvers 62, 64, and to generate control signals that are electrically communicated to the flap PDU 36 and to the right and left flap asymmetry brakes 46, 48 for controlling the flap actuator system 20.

Figure 3:
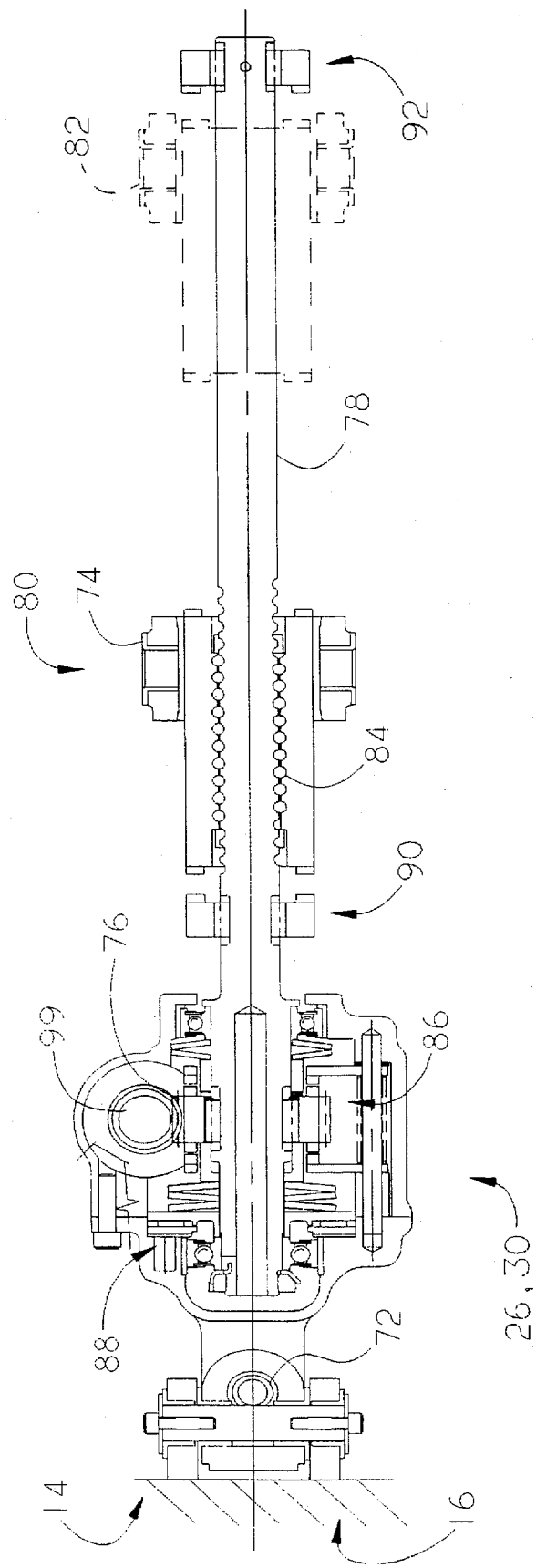
FIG. 3 is a longitudinal cross-sectional view depicting one of the outermost control panel actuators of FIG. 2.
Figure 4:
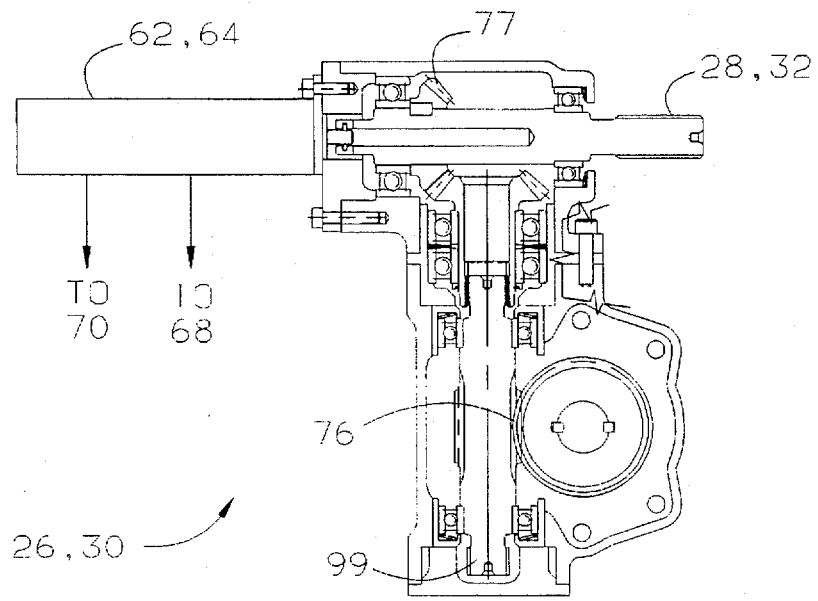
FIG. 4 is a transverse cross-sectional view of the actuator of FIG. 3 system.

As shown in FIGS. 3 and 4, the right and left outermost flap actuators 26, 30 of the embodiment of our invention depicted in FIG. 2 are recirculating ballscrew type actuators of conventional construction. These actuators 26, 30 include an apertured ear 72 at one end thereof for attachment to the right or left wing 14, 16, and a translating ball nut 74 thereof adapted for attachment to one of the outboard flaps 24f, 24a. Rotary power applied to the input 28, 32 of the actuator 26, 30 is converted into rotation of a ballscrew 78 by action of an intermediate shaft 99 and gear sets 76 and 77. Rotation of the ballscrew 78 is converted into translating motions of the ball nut 74 by action of the recirculating ball mechanism 84 of the ball nut 74 for moving the ball nut 74 between a retracted position 80 and an extended position 82.

The outmost flap actuators 26, 30 of the exemplary embodiment of our invention depicted in FIG. 2 further include an integral force limiter 86, and an integral no-back device 88. The integral force limiter 86 is configured to lock the flap power drive means 34 if the force being transmitted through the actuator 26, 30 exceeds a pre-determined value, to prevent damage to the flap actuator system 20 should a problem such as jamming of one of the flaps occur. The integral force limiter and flap PDU 36 are sized relative to one another such that when the integral force limiter 86 actuates, it applies sufficient braking force to the drive means 34 to stall the PDU 36 and prevent further rotation of the drivelines 40, 44. The force limiter 86 of the actuators 26, 30 depicted in FIG. 3 is of a type described in significantly greater detail in U.S. Pat. No. 4,459,867 to Jones, and is assigned to the assignee of our invention.

The integral no-back device 88 of the outermost flap actuators 26, 30 of the exemplary embodiment depicted in FIG. 2 are provided to hold the actuators 26, 30 against further movement should the respective operably connection between the right or left asymmetry brakes 46, 48 and the right or left outermost flap actuator 26, 30 be severed, such that the asymmetry brakes 46, 48 would not be operable to hold the outermost flap actuator 26, 30 against further rotation. The particular type of no-back device illustrated in FIG. 3 utilizes a skewed roller bearing friction device of a type generally described in a co-pending U.S. application Ser. No. 08/340,938, by Russ, assigned to the assignee of the present invention.

The no-back device 88 depicted in FIG. 3 is a unidirectional device because, for the exemplary embodiment depicted, the aerodynamic loads always act in one direction only on the outboard flap 24f, attached to the outermost flap actuators 26, 30. In other applications of our invention, it may be desirable to have a bidirectional no-back device where loading on the particular control panel connected to the outermost actuator can be bidirectional. The no-back device 88 is included in the flap control system 20 of the exemplary embodiment because the outboard flaps 24f, a of the aircraft 10 of the exemplary embodiment exert such a strong effect on the lift producing capability of the wings 14, 16 that the remainder of the control panels on the aircraft cannot compensate for any significant amount of asymmetry between the outboard flaps 24f, 24a. In other applications of our invention, such as the slat control actuation system 18 of the exemplary embodiment described below, wherein asymmetry between control panels on opposite sides of the aircraft or even loss of one of the control panels can be compensated for, by using other control panels on the aircraft, the no-back device 88 may not be required.

The outermost flap actuators 26, 30 of the exemplary embodiment also include end of travel stops 90, 92 for limiting the travel of the ball nut 74 to a minimum and a maximum extension respectively of the actuator 26, 30.

As shown in FIG. 4, the resolvers 62, 64 are operably connected to the inputs 28, 32 of the outermost flap actuators 26, 30 in the exemplary embodiment. This arrangement was selected for sake of convenience in this particular application, but in other applications other drive arrangements other types of sensors, or alternate sensor locations, could also be used with equal facility.

Figure 5:
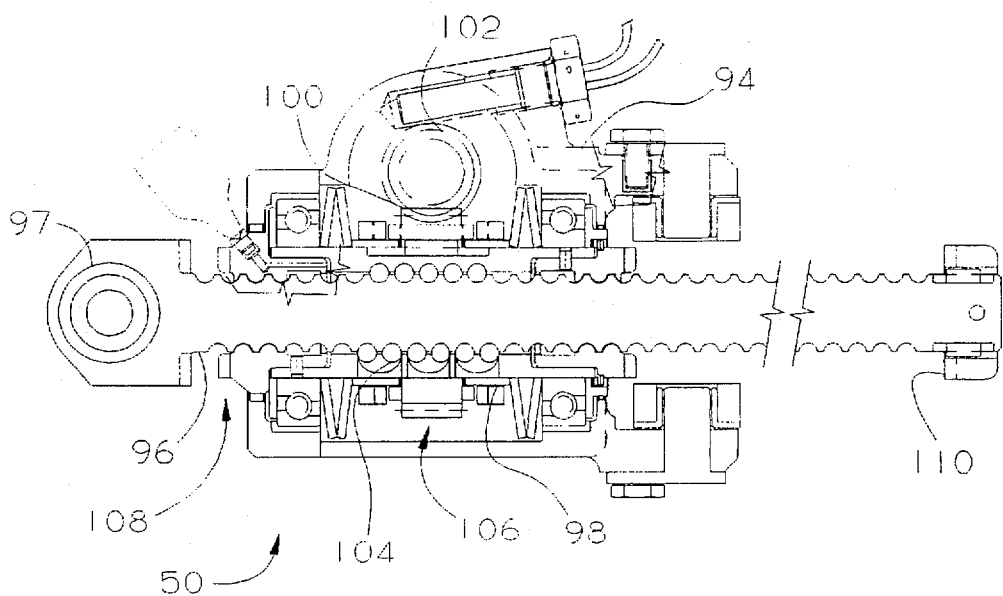
FIG. 5 is a longitudinal cross-sectional view depicting one of the intermediate control panel actuators of the actuation system of FIG. 2.

As shown in FIG. 5, the intermediate flap actuators 50 of the exemplary embodiment are also recirculating ballscrew type devices. The housings 94 of the intermediate flap actuators 50 are attached to the right and left wings 14, 16 by means (not shown), and are connected to the flaps 24a–f by means of an apertured end 97 of the ballscrew 96. In the intermediate flap actuators 50, the ball nut 98 is located within the housing 94 and is rotated by action of a gear set 100 operably connected between the input 102 of the actuator 50 and the ball nut 98. Rotation of the ball nut 98 is converted into translating motion of the ballscrew 96 through action of the recirculating ball nut mechanism 104, in a manner well known to those having skill in the art. The intermediate flap actuator 50 also includes an integral force limiter 106 having a construction and function similar to that previously described above with respect to the outermost flap actuators 26, 30. End of travel stops 108, 110 are also provided to limit the travel of the ballscrew 96 of the intermediate actuators 50 for a movement between a minimum and maximum extended position thereof. The intermediate actuators 50 in the flap system 20 do not include integral no-back devices.

In the flap control actuation system, the end of travel stops 90, 92 on the left and right outermost actuators 26, 30 are positioned to engage before the end of travel stops 108, 110 on any of the intermediate flap actuators 50. As a result, the outermost flap actuators 26, 30 act as master end of travel stops for the entire flap control actuation system 20, and the intermediate flap actuators 50 function as slave actuators with the outermost flap actuators 26, 30 providing end of travel protection for all intermediate flap actuators 50.

Figure 6:
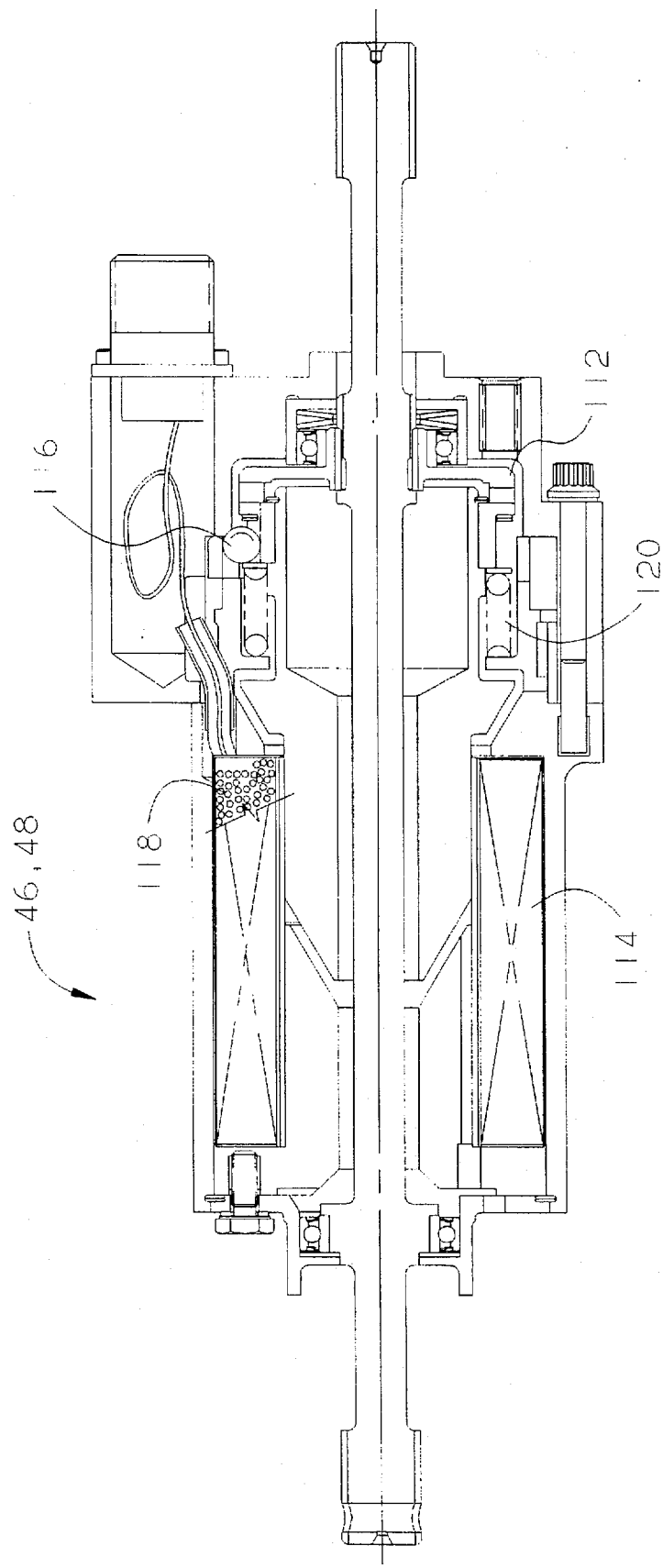
FIG. 6 is a longitudinal cross-section through one of the asymmetry brakes of the actuation system of FIG. 2.

As shown in FIG. 6, the right and left flap asymmetry brakes 46, 48 include a jaw-type clutch 112 coupled to an electrical solenoid 114 through a ball spline mechanism 116 for selectively engaging or disengaging the brake 26, 30 in response to command signals received from either or both of the first and second slat/flap control units 68, 70. The asymmetry brake depicted in FIG. 6 is described in greater detail in co-pending patent application, application Ser. No. 08/602,433, filed Feb. 16, 1996, assigned to the assignee of the present invention, and is incorporated herein by reference.

Each asymmetry brake 46, 48 is capable of holding the flaps in a given position against the full torque output of the flap PDU 36. A spring 120 provides a biasing force urging the clutch 112 to be normally engaged. In order to move the flaps 24a–f, therefore, the slat/flap control units 68, 70 must first release both the right and left asymmetry brakes 46, 46 by sending a signal to the brakes 46, 48 to energize the solenoid 114 and disengage the jaw clutch 112.

The solenoid 114 includes a bifilar winding 118 having two independent electrical circuits each connected individually to one or the other of the slat/flap control units 68, 70. The bifilar winding allows the solenoid to actuate in substantially the same amount of time, no matter which slat/flap control unit 68, 70 is sending an energizing signal. Thus performance of the asymmetry brakes 46, 48 is substantially identical when operating with either control unit 68, 70.

The asymmetry brakes 46, 48 must actuate virtually instantaneously if commended to do so by the control units 68, 70, in order to prevent an unacceptable asymmetry brake 46, 48 depicted in FIG. 6 and described in the referenced co-pending patent application meets this requirement by having the capability of stopping a drivetrain 40, 44 rotating at about 1500 rpm in less than 0.05 seconds.

THE SLAT CONTROL ACTUATION SYSTEM

The slat control actuation system 18 includes a right outermost slat actuator 126 having a rotatable input 128 for receiving a driving torque. The right outermost slat actuator 126 is operably connected between the right wing 14 and the right outboard slat 22h of the right wing 14 for moving the right outboard slat 22h relative to the right wing 14 when driving torque is applied to the rotatable input 128 of the right outermost slat actuator 126.

The slat actuation system 18 also includes a left outermost slat actuator 130 having a rotatable input 132 for receiving a driving torque. The left outermost slat actuator 130 is operably connected between the left wing 16 and the left outboard slat 22a of the left wing 16 for moving the left outboard slat 22a 5relative to the left wing 16 when a driving torque is applied to the rotatable input 132 of the left outermost slat actuator 130.

Slat power drive means, generally indicated at 134, are operably connected between the rotatable inputs 128, 132 of the right and left outermost slat actuators 126, 130 for providing driving torque simultaneously to the inputs 128, 132 of the actuators 126, 130 for symmetrically positioning the right and left outboard slats 22h, 22a relative to the right and left wings 14, 16 respectively. Specifically, the slat power drive means 134 includes a slat power drive unit (PDU) 136 having a first output 138 operably connected by a right driveline portion 140 of the power drive means 134 to the right outermost slat actuator 126, and further having a second output 142 operably connected by a left driveline portion 144 of the slat power drive means 134 to the left outermost slat actuator 130.

The right driveline portion 140 of the slat power drive means 134 includes a selectively engagable right slat asymmetry brake 146 disposed between the slat PDU 136 and the right outermost slat actuator 126 for stopping rotation of the right driveline 140 when the right slat asymmetry brake 146 is engaged. Specifically, the right slat asymmetry brake 146 is located immediately inboard of the right outermost slat actuator 126 and operably connected to the rotatable input 128 of the right outermost slat actuator 126.

The left driveline portion 144 of the slat power drive means 134 includes a selectively engagable left slat asymmetry brake 148 disposed in the left driveline 144 between the slat PDU 136 and the left outermost slat actuator 130, for stopping rotation of the left driveline 144 when the left slat asymmetry brake 148 is engaged. Specifically, the left slat asymmetry brake 148 is located immediately inboard of the left outermost slat actuator 130, and operably attached to the rotatable input 132 of the left outermost slat actuator 130.

Between the slat PDU 136 and the right and left slat asymmetry brakes 146, 148, the right and left driveline portions 140, 144 include seven intermediate slat actuators 150 connected to one another and to the right and left slat asymmetry brakes 146, 148 by a series of torque shaft/support bearing units 152. The right and left inboard and middle slats 22e, d; 22f, g; 22c, b are each operably connected to the right and left wings 14, 16 respectively, by two of the intermediate slat actuators 150. The right and left outboard slats 22h, 22a are each respectively operably connected to the right and left wings 14, 16 by one of the intermediate slat actuators 150 and the right or left outermost slat actuators 126, 130.

Between the slat PDU 136 and the innermost right and left intermediate slat actuators 154, 156 the right and left drivelines 140, 144, respectively, each include a series of torque tubes 158 and angle gearboxes 160 for transmitting driving torque from the slat PDU 136 to the remainder of the right and left drivelines 140, 144.

The redundant slat control means 66 are operably connected between the slats and the right and left slat asymmetry brakes 146, 148 for sensing an asymmetry between the positions of the right slats 22e–h left slats relative to the 22a–d; and for engaging the slat asymmetry brakes 146, 148 when the asymmetry between the positions of the right and left slats 22e–h; 22a–c exceeds a pre-determined maximum allowable value.

The slat control means 66 includes right and left angular position sensors in the form of resolvers 162, 164 operably connected respectively to the right and left outermost slat actuators 126, 130 for sensing an angular position of the rotatable inputs 128, 132 of the outermost slat actuators 126, 130, in the same manner as described above with respect to the resolvers 62, 64 of the flap control system 20.

The first and second slat/flap control units (SFCU) 68, 70 are electrically connected to receive a slat asymmetry signal from the right and left resolvers 162, 164, and to generate control signals that are electrically communicated to the slat PDU 136 and to the right and left slat asymmetry brakes 146, 148 for controlling the slat actuator system 18.

The right and left slat asymmetry brakes 146, 148 are identical in construction and function to the right and left flap asymmetry brakes 46, 48 described above. The right and left outermost slat actuators 126, 130 and the intermediate slat acutators 150 are identical in construction and function to the corresponding right and left outermost flap actuators 46, 48 and the intermediate flap actuators 50 in all but two respects. First, the outermost slat actuators 146, 148 of the exemplary embodiment do not include no-back devices. No-back devices are not required in the outermost slat actuators 126, 130 because even if the outboard slats 22h, a were lost entirely in the exemplary aircraft 10, other control systems and surfaces of the aircraft 10 would be capable of compensating for any asymmetry in lift that the loss of one of the outboard slats 22a, h might create between the right and left wings of the aircraft 10. The second difference between the actuators of the slat system 18 and the flap system 20 is that in the slat system, the end of travel stops in the innermost intermediate actuators 156, 154 are adjusted to engage before any of the stops in the remaining intermediate actuators 150 or the right and left outermost actuators 126, 130 of the slat actuation system 18. As a result, the right and left innermost intermediate actuators 154, 156 are the master actuators and the remaining intermediate actuators 150 and the right and left outermost slat actuators 126, 130 are the slave actuators with respect to the end of travel stop function.

SYSTEM CONTROL AND OPERATION

Figure 7:
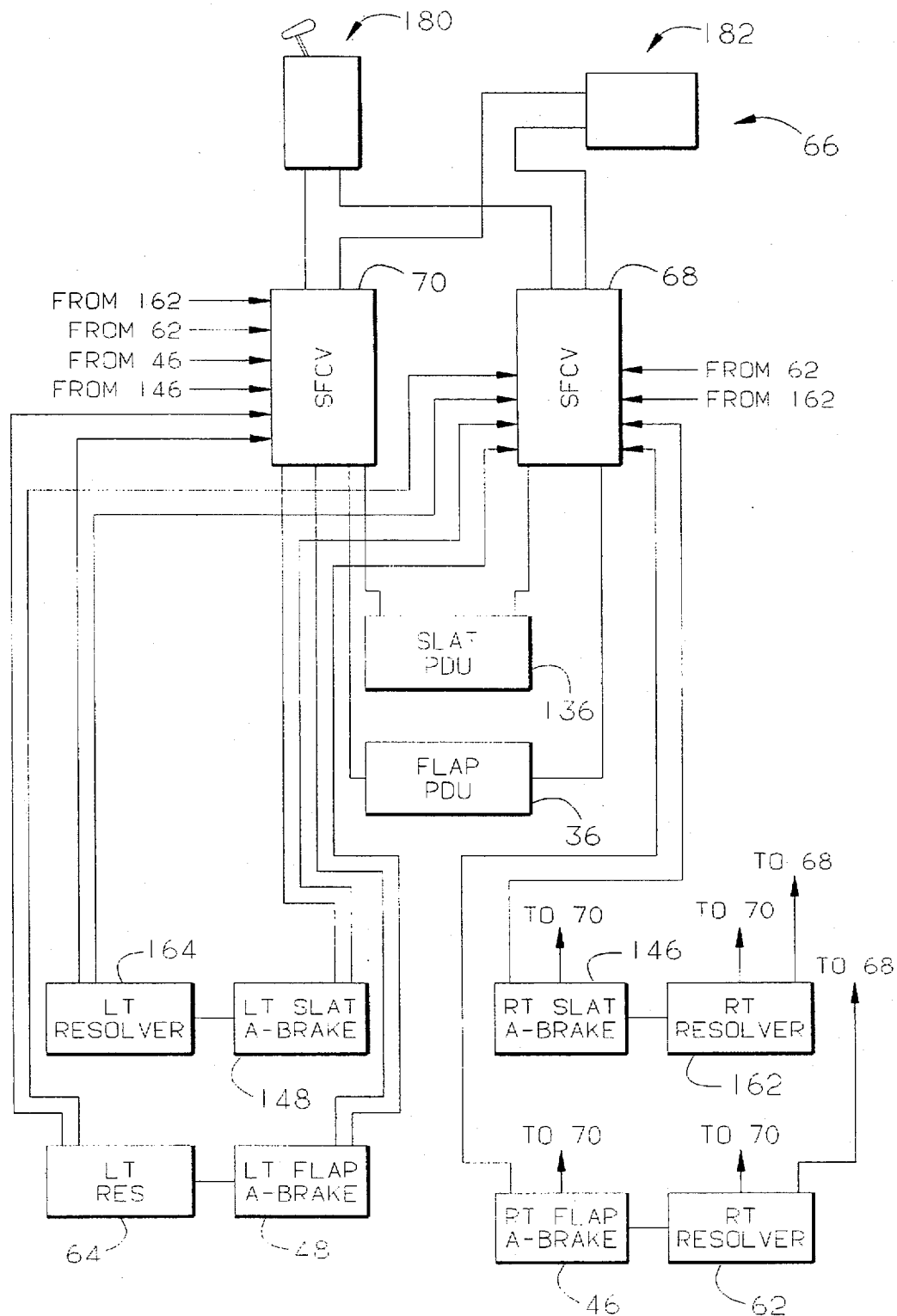
FIG. 7 is a schematic of the control circuit for the actuation system of FIG. 2.

As will be readily appreciated from the description thus far and an examination of the schematic of the flap control system depicted in FIG. 7, the slat/flap control actuation system of the exemplary embodiment of our invention includes a high degree of redundancy. This degree of redundancy is necessitated for two reasons. First, an asymmetry problem in the slat or flap system can cause catastrophic problems relating to control of the aircraft, particularly during take-off and landing operations where the aircraft is so close to the ground that there is little time to compensate for any problem which may occur. Second, the actuation systems are designed to respond to changes in control commands during normal operation within fractions of a second, leaving no time to switch from a primary to a backup system, should a problem occur, before the actuation system potentially drives some of the control surfaces into an asymmetry condition.

The control system of the exemplary embodiment actually is comprised of two identical slat/flap control systems which normally function in tandem and totally independent of each other to position the slats and flaps, and de-energize the asymmetry brakes should a problem occur. As shown in FIG. 7, each of the slat and flap PDUs 136, 36, the asymmetry brakes 46, 48, 146, 148 and the resolvers 62, 64, 162, 164 includes two independent electrical circuits therein, one connected to provide or receive signals from the first slat/flap control unit 68, and the other for providing or receiving signals from the second slat/flap control unit 70. The two independent control circuits thus formed normally operate continuously and in tandem with one another, so that if a failure should occur in either of the control circuits the other control circuit is already up and running and providing or receiving appropriate signals to maintain control of the aircraft 10.

During normal operation of the aircraft, therefore, control inputs received from the pilot via either the control lever 180 or the alternate flap switch 182 are simultaneously communicated to both the first and second slat/flap control units 68, 70. Each of the first and second slat/flap control units 68, 70 compares the input command from the pilot to the signal it is receiving at its respective input from the resolvers 62, 64, 162, 164, and generates an appropriate independent control signal to either the slat or flap PDU 136, 36, to cause the appropriate PDU to drive the slats or flaps to the position desired by the pilot. Each of the slat/flap control units 68, 70 also continuously compares the respective inputs from the right and left flap resolvers 62, 64 and the right and left slats resolvers 162, 164 to verify that movement of the right and left slat or flap systems is symmetrical within predetermined limits. Should an asymmetry condition occur which exceeds a pre-determined maximum allowable value, both the first and second slat/flap control units 68, 70 will send a signal to its respective electrical circuit within the appropriate asymmetry brake 46, 48, 146, 148 to lock the actuation system for the control panels experiencing asymmetry against further movement with respect to the wings 14, 16.

From the foregoing description, those having skill in the art will readily recognize that our invention achieves the object of providing a slave control panel actuation system, including asymmetry brakes, which will fit into aircraft wings having narrow supercritical air foil shapes, and yet provide a degree of operational convenience and safety with regard to preventing asymmetry which is as good or better than that provided by prior actuation systems. It will be further appreciated, that the actuation system of our invention includes highly reliable components of straightforward design that can be produced at reasonable cost and minimum weight.

Those having skill in the art will further recognize that although we have described our invention herein with respect to certain embodiments and applications thereof, many other embodiments and applications of our invention are possible within the scope of our invention as described in the appended claims. For example, the actuation system of our invention can be applied to control panels other than flaps or slats. Our system is also applicable; to the control of other types of actuators than the ballscrew actuators of the exemplary embodiment, such as rotary actuators. The individual components comprising our invention may be constructed in an almost infinite variety of different configurations within the scope of our invention. The actuation system of our invention is not necessarily limited to use in aircraft.

It is understood, therefore, that the spirit and scope of the appended claims should not be limited to the specific embodiments described and depicted herein.

We claim:

1. In an aircraft having right and left wings extending in opposite directions from a centerline of said aircraft, each of said wings including a flight control panel thereof movable to its respective wing, an actuation system comprising:

a) a right wing control panel actuator having a rotatable input for receiving a driving torque;
   said right control panel actuator being operably connected between said right wing and said flight control panel of said right wing for moving said right control panel relative to said right wing when said driving torque is applied to said rotatable input of said right control panel actuator;

b) a left wing control panel actuator having a rotatable input for receiving a driving torque;
   said left control panel actuator being operably connected between said left wing and said flight control panel of said left wing for moving said left control panel relative to said left wing when said driving torque is applied to said rotatable input of said left control panel actuator;

c) power drive means operably connected between said rotatable inputs of said right and left control panel actuators for providing driving torque simultaneously to said inputs of said actuators for symmetrically positioning said right and left control panels relative to said right and left wings respectively;
   said power drive means including a power drive unit having a first output operably connected by a right driveline portion of said power drive means to said right control panel actuator, and further having a second output operably connected by a left driveline portion of said power drive means to said left control panel actuator;

said right driveline portion of said power drive means including a selectively engagable right asymmetry brake disposed between said power drive unit and said right control panel actuator for stopping rotation of said right driveline when said right asymmetry brake is engaged;

said left driveline portion of said power drive means including a selectively engagable left asymmetry brake disposed between said power drive unit and said left control panel actuator for stopping rotation of said left driveline when said left asymmetry brake is engaged; and d) control means operably connected between said control surfaces and said asymmetry brakes for sensing an asymmetry between the positions of the right and left control panels relative to their respective right and left wings, and for engaging said asymmetry brakes when said asymmetry between the positions of the right and left control surfaces exceeds a predetermined maximum allowable value.

2. The aircraft of claim 1 wherein said control means includes a right and a left angular position sensor operably connected respectively to said right and left control panel actuators for sensing an angular position of said rotatable inputs thereof.

3. The aircraft of claim 1 wherein said right and left control panel actuators each include an integral no-back device for holding said actuators against further movement should the respective operable connection between the right or left driveline and said right or left actuator be severed.

4. The aircraft of claim 1 wherein:

each of said right and left driveline portions further includes a plurality of intermediate control panel actuators operably connected together in a series drive arrangement extending between said power drive unit and said right and left control panel actuators respectively;

said right asymmetry brake is disposed between said right control panel actuator and the immediately adjacent intermediate control panel actuator in said right driveline; and said left asymmetry brake is disposed between said left control panel actuator and the immediately adjacent intermediate control panel actuator in said left driveline.

5. The aircraft of claim 4 wherein each of said right and left actuators, and each of said intermediate actuators includes an integral force limiter for preventing rotation of said driveline should driving force passing through the actuator exceed a predetermined maximum value.

6. The aircraft of claim 4 wherein:

all of said intermediate and said right and left control panel actuators are operably connected for positioning one or more control panels of their respective wing:

all of said control panel actuators including an output operably coupled to said one or more control panels of their respective wing for positioning said one or more control panels; and said right and left control panel actuators include integral end of travel stops for limiting a maximum travel of the output of all actuators in their respective driveline.

7. The aircraft of claim 4 wherein all of said intermediate and said right and left control panel actuators are operably connected for positioning one or more control panels of their respective wing:

all of said control panel actuators including an output operably coupled to said one or more control panels of their respective wing for positioning said one or more control panels; and one of said intermediate control panel actuators in each of said right and left drivelines includes integral end of travel stops for limiting a maximum travel of the output of all actuators in their respective driveline.

* * * * *